United States Patent [19]

Pack et al.

[11] 4,423,510
[45] Dec. 27, 1983

[54] LASER TUBE DESIGN INCORPORATING LOW INDUCTANCE CAPACITOR

[75] Inventors: John L. Pack; Roy K. Williams, both of Murrysville; Chi-Sheng Liu, Monroeville, all of Pa.

[73] Assignee: Westinghouse Electric Corp., Pittsburgh, Pa.

[21] Appl. No.: 322,620

[22] Filed: Nov. 18, 1981

Related U.S. Application Data

[63] Continuation-in-part of Ser. No. 67,250, Aug. 17, 1979, abandoned.

[51] Int. Cl.³ .............................................. H01S 3/097
[52] U.S. Cl. ...................................... 372/82; 372/87; 372/56
[58] Field of Search .................. 372/56, 81, 69, 82, 372/87, 91

[56] References Cited

U.S. PATENT DOCUMENTS 3,757,246  9/1973  Basting et al.
3,828,277  8/1974  Otto et al.
4,039,971  8/1977  Wang et al.

Primary Examiner—James W. Davie
Assistant Examiner—Léon Scott, Jr.
Attorney, Agent, or Firm—M. P. Lynch

[57] ABSTRACT

A multilayer high temperature, low inductance capacitor consisting of alternate layers of metal and dielectric insulator materials which are inert with respect to metal halide environments is directly affixed to a planar electrode of a high temperature metal halide laser system to improve laser performance.

5 Claims, 5 Drawing Figures

LASER TUBE DESIGN INCORPORATING LOW INDUCTANCE CAPACITOR

CROSS-REFERENCE TO RELATED APPLICATION

This application is a continuation-in-part of Ser. No. 67,250 filed Aug. 17, 1979, abandoned.

BACKGROUND OF THE INVENTION

Metal halide lasers, such as mercury halide, zinc halide and cadmium halide, require high temperature operation and must be excited by electrical discharges with ultrafast current pulses and very high peak current. These specifications require low inductance laser tube designs suitable for high temperature operation.

These electrical requirements can be easily accommodated for low temperature, i.e., room temperature, laser operation by inserting low inductance capacitors across the laser electrodes. This technique is not compatible with the chemically corrosive laser gas media of metal halide lasers operating at pressures exceeding atmospheric pressure and temperatures of up to 600° C.

SUMMARY OF THE INVENTION

There is disclosed herein with reference to the accompanying drawing a laser tube design incorporating a low inductance capacitor concept capable of withstanding the high temperature laser operation of a metal halide laser and the chemical reactivity of the resulting corrosive laser gases. The capacitor design is such that the capacitor can operate within high pressure laser environments, i.e. greater than 1 atmosphere, without degradation.

The capacitor configuration is secured to at least one of the laser electrodes and is positioned within the quartz laser discharge tube. The capacitor is a dielectric capacitor consisting of alternate folded layers, or sheets, of a metal conductor and dielectric material extending substantially the length of the electrode with the metallic layers of the capacitor extending to the opposite electrode to shunt the laser gap and thus effectively reduce the circuit inductance.

The disclosed built-in low inductance capacitor technique provides very high peak current pulses in the laser discharge region while significantly reducing the current required in the electrical feedthroughs entering the laser discharge tube from an external power source. Furthermore, since the disclosed capacitor is constructed of high temperature materials permitting it to operate within the laser discharge tube, the traditional requirement for low inductance metal to glass seals for the feedthroughs in the quartz discharge tube are significantly reduced.

BRIEF DESCRIPTION OF THE DRAWINGS

The invention will become more readily apparent from the following exemplary description in connection with the accompanying drawings.

DESCRIPTION OF THE PREFERRED EMBODIMENT

Figure 1:
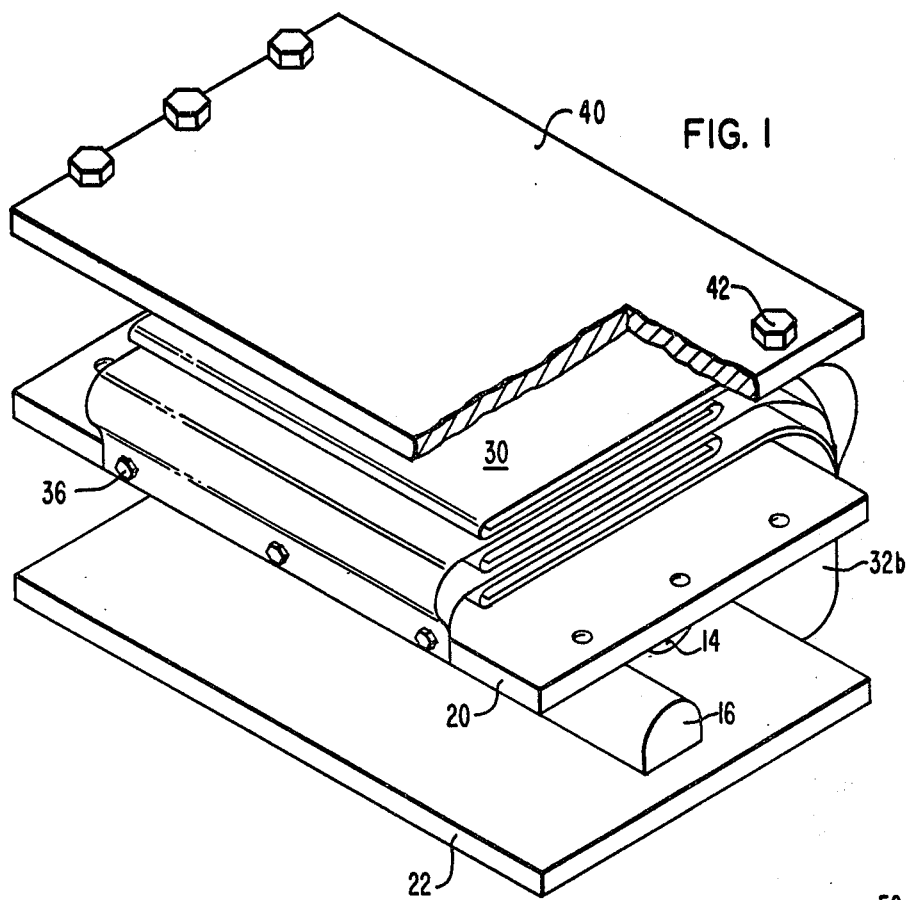
FIG. 1 is a pictorial illustration of a built-in low inductance capacitor constructed of materials to permit its operation within the laser discharge tube of a mercury halide laser.
Figure 2:
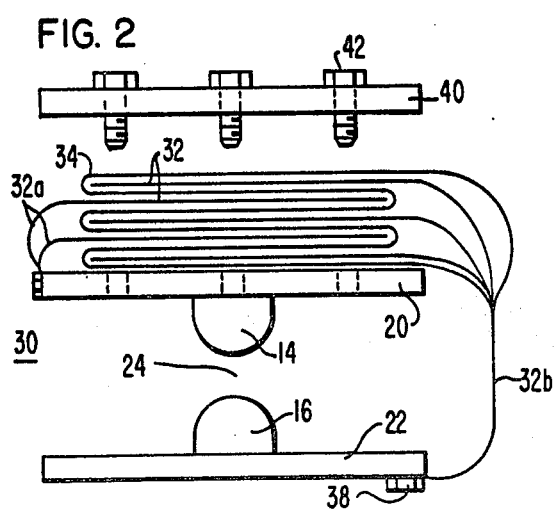
FIG. 2 is an end view of the embodiment of FIG. 1.
Figure 3:
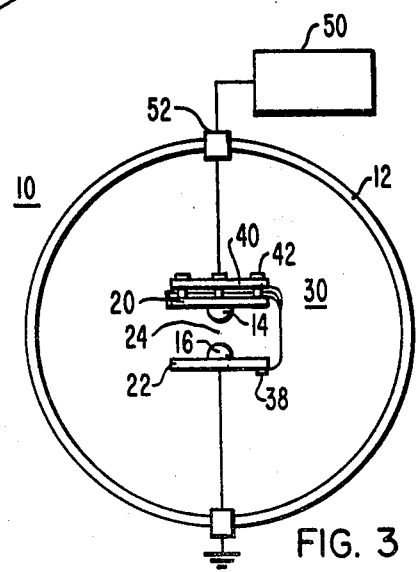
FIG. 3 is an illustration of the laser electrode configuration and accompanying low inductance capacitance of FIGS. 1 and 2 positioned within a quartz laser discharge tube.

A typical embodiment of the unique low inductance capacitor suitable for operation within a mercury halide laser environment in combination with the laser electrodes is illustrated in FIGS. 1, 2 and 3.

The laser system 10 is illustrated as consisting of a tubular enclosure 12, typically consisting of a glass or quartz tube, surrounding planar transverse electrodes 14 and 16 extending from metal support plates 20 and 22, respectively, and defining a laser discharge region 24 therebetween.

In the embodiment illustrated in FIGS. 1, 2 and 3, a dielectric capacitor 30, consisting of multiple alternate layers of metal sheets 32 and a dielectric insulator 34, is positioned on a surface of the support member 20 opposite the surface of the support member which supports the electrode 14. A metal retainer plate 40 is secured to the electrode support plate 20 via bolts 42 to compress and secure the position of the capacitor 30 in contact with the support plate 20. The capacitor 30, as more clearly illustrated in FIG. 2, is illustrated as consisting of a folded continuous sheet of dielectric insulator 34 with alternate metal sheets 32a being secured to the support plate 20 via a suitable fastener 36 while alternate metal sheets 34b extend to the support plate 22 associated with electrode 16 and are secured thereto by fastener 38. The capacitor 30 extends for approximately the total length of the electrodes 14 and 16 thus providing a continuous dielectric capacitor over substantially the entire discharge region 24. In order to meet the high temperature and chemically corrosive conditions of metal halide and metal excimer laser operation the selection of materials for the metal sheets 32 and the dielectric insulator 34 must take into consideration the typical operating temperatures approaching 600° C. and the chemical activity associated with the particular metal vapor laser medium. It has been determined experimentally that the selection of stainless steel, graphite, or a noble metal material such as gold or platinum for the metal sheets 32 and a commercially available polyimide film such as commercially available Kapton or Mica, or quartz for the dielectric insulator 34 produces a capacitor 30 suitable for withstanding laser operation at elevated temperatures. While silver is a suitable metal sheet material for some applications, its reactivity with mercury halides makes it a poor choice for a mercury halide laser application. The desired voltage rating of any given application can be achieved through the use of the proper number of layers of the metal sheets 32 and the dielectric insulator 34.

The particular construction design of the capacitor 30 of FIGS. 1, 2 and 3 is particularly advantageous for the typical transverse lasers which are approximately two feet in length or longer with a discharge region 24 of approximately one centimeter and employing a working voltage in a range of between approximately a few kV to 20 kV or more.

In the illustration of FIG. 3, the electrode 16 is connected to an electrical ground through a feedthrough 23 in the tubular housing 12 while electrode excitation is supplied from an external power supply 50 through a feedthrough 52 in the tubular housing 12 to the electrode 14.

Assume for the purposes of discussion that a working voltage of 20 kV is desired. Further assume that the length of the transverse electrodes 14 and 16 is approximately 30 inches, or 76 centimeters, and that the gap of the discharge region 24 between the electrodes 14 and 16 is approximately one centimeter. If a pulse width of less than 30 nanoseconds is desired and a capacitance of approximately 20 nanofarads is desired for exciting the laser medium present within the discharge gap region 24 at an operating temperature of 200° C., the capacitance per each layer of the dielectric insulating material 34 can be calculated as follows:

$$C = 0.2244 KA/D\ \mu\mu F$$

Where
K = dielectric constant of the dielectric,
A = area of one surface of a layer of the dielectric insulator 34, in square inches, and
D = spacing (inches) between adjacent layers of the dielectric insulator.

In an experimental evaluation of the embodiment of FIGS. 1, 2 and 3 employing Kapton as the dielectric insulator 34 having a dielectric constant K of 3.5, an area for each of the layers of dielectric film of 18 square inches (2 in.×9 in.) and a spacing between adjacent layers of the dielectric insulator of approximately 0.010 in., the capacitance for each layer in accordance with the above equation is approximately 1.4 nanofarads.

Thus seven spaces or eight layers of dielectric insulator results in a capacitance of approximately 10 nanofarads. If two such capacitors are positioned side-by-side along the length of the electrode support 20 this would produce the desired 20 nanofarad capacitance. The thickness of the metal sheets 32 chosen for the above implementation was approximately 0.002 in.

The retainer plate 40, when secured to the support plate 20, tightly condenses the alternate layers of metal sheets 32 and dielectric insulator 34 to effect a compact capacitor/electrode combination which can be readily positioned within the laser discharge tube 12.

The coupling of the metal sheets 32b to the support plate 22 associated with the opposite electrode 16 significantly reduces the circuit inductance. In experimental tests, a current pulse width of about 25 nanoseconds was obtained indicating that the circuit inductance was in the order of three nanohenries. Peak currents of about 20 kiloamperes were obtained with a charging voltage of approximately 14 kilovolts.

Figure 4:
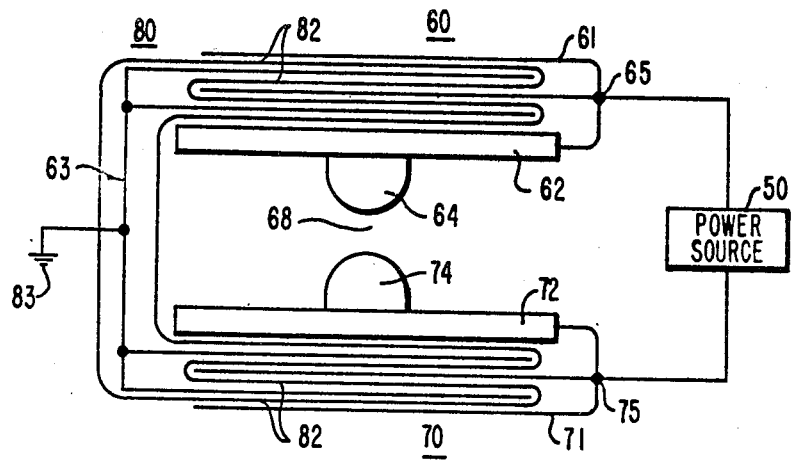
FIGS. 4 and 5 are alternate embodiments of the novel built-in low inductance high temperature capacitor in combination with laser electrodes.

In the alternate embodiment of FIG. 4 multilayer dielectric capacitors 60 and 70 are positioned in contact with surfaces of electrode support plates 62 and 72, respectively. Electrodes 64 and 74 extend perpendicularly from opposite surfaces of plates 62 and 72 and define the discharge gap region 68. A single dielectric insulator sheet 80 forms multiple dielectric insulator layers 82 for the capacitors 60 and 70. The metal sheets of the capacitor 60 consists of folded layers, or alternate sheets, 61 which are secured to the support member 62 and alternate sheets 63 which extend between alternate layers of the dielectric insulator 80 of both capacitors 60 and 70. In addition to the metal sheets 63, capacitor 70 includes alternate metal sheets 71 which are connected to the support plate 72 of the electrode 74. An electrical ground terminal 83 is connected to the metal sheets 63 while capacitor charging terminals 65 and 75 of the capacitor metal plates 61 and 71, respectively, are connected to a common charging voltage source thereby establishing the combination of capacitors 60 and 70 in a Blumlein circuit which yields twice the voltage as that produced by the embodiment of FIGS. 1, 2 and 3 in response to the same charging voltage.

Figure 5:
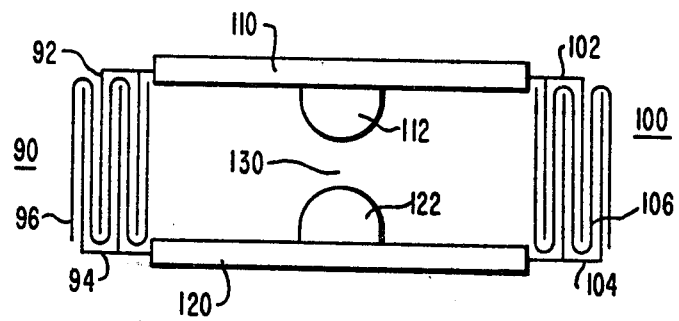

In the embodiment of FIG. 5 capacitors 90 and 100 are constructed in the manner described above. They are connected in a shunting relationship between the support plates 110 and 120 associated with laser electrodes 112 and 122, respectively. This combination of electrode assemblies and capacitors essentially encloses in a tubular fashion the laser discharge region 130. The capacitor 90 consists of folded layers or alternate metal sheets 92 connected to support member 110 and alternate metal sheets 94 connected to support member 120. A dielectric insulator 96 forms dielectric insulator layers between the adjacent metal sheets 92 and 94. Similarly the capacitor 100 consists of folded layers or alternate metal sheets 102 which are connected to the support member 110 and alternate metal sheets 104 which are connected to support member 120. A dielectric insulator 106, as described above, forms dielectric insulator layers between the adjacent metal sheets 102 and 104. The shunting of the laser discharge gap 130 by capacitors 90 and 100 effectively reduces the circuit inductance by a factor of two over the capacitor/electrode configuration of FIGS. 1, 2 and 3.

While the above disclosure identifies the use of selected noble metals, graphite and stainless steel for the metal materials of the respective capacitor configurations in combination with a suitable dielectric insulator for operation in laser environments at 200° C., the specific operating temperature and laser medium will define the preferred combination of materials for the metal sheets and dielectric insulator. For example, in a laser operating at temperatures of 400° C. or higher the capacitors would typically use solid dielectric material such as quartz or mica sheet laminate in place of the commercially available Kapton.

The disclosure of suitable high temperature low inductance capacitors for operation within the laser discharge tube significantly reduces the traditional requirements for low inductance metal-to-glass feedthroughs in the laser discharge tube to accommodate the high current which traditionally is supplied through the laser discharge tube from an external source. The disclosed technique for positioning a capacitor totally within the laser discharge tube greatly reduces the electromagnetic interference due to the shielding effect of the capacitors located in the vicinity of the laser discharge region.

I claim:

1. In a metal halide laser apparatus including spaced-apart electrode means positioned within a laser housing containing a metal halide laser medium and defining a laser discharge region therebetween, and electrical excitation means operatively connected to said electrode means for exciting said metal halide laser medium by electrical discharge to produce a laser radiation output from appropriate laser optics associated with said laser housing, the improvement for improving laser operation by minimizing the inductance of the laser assembly, said improvement comprising:
a capacitor means positioned within said laser tube housing and connected to said spaced-apart electrode means and extending approximately the entire length of said electrode means to minimize the inductance of the laser apparatus, said capacitor means consisting of alternate layers of metal and dielectric insulator, said metal and dielectric insulator being materials capable of withstanding the chemically corrosive gas environment of said metal halide laser medium at elevated temperatures, said metal being selected from a group consisting of gold, platinum, graphite and stainless steel, and said dielectric insulator being selected from a group consisting of a polyimide film and quartz.

2. In an apparatus as claimed in claim 1 wherein said spaced-apart planar first and second electrode means are elongated electrode means extending longitudinally within said laser housing, and further including retainer means for mechanically securing said capacitor means to a surface of said first electrode means opposite from the surface adjacent to said laser discharge region and extending substantially the entire length of said first electrode means.

3. In a metal halide laser apparatus including a laser housing containing a metal halide laser medium and spaced-apart planar electrode means defining a laser discharge region therebetween, an excitation means connected to said electrode means to excite said metal halide laser medium by electrical discharge to produce a laser radiation output from appropriate laser optics associated with said laser housing, the improvement for improving laser operation by minimizing the inductance of the laser assembly, said improvement comprising:

first and second capacitor means positioned within said laser tube housing and connected to and extending perpendicularly between said spaced-apart planar electrode means for approximately the entire length of said electrode means to essentially enclose said laser discharge region and minimize the inductance of said laser apparatus, each of said first and second capacitor means consisting of alternate layers of metal and a dielectric insulator, said metal and dielectric insulator being materials capable of withstanding the chemically corrosive environment of said metal halide laser medium at temperatures of up to approximately 600° C., said metal being selected from a group consisting of gold, platinum, graphite and stainless steel, and said dielectric insulator being selected from a group consisting of a polyimide film and quartz.

4. In a metal halide laser apparatus including a laser housing containing a metal halide laser medium and first and second spaced-apart planar electrode means having adjacent surfaces defining a laser discharge region therebetween, an excitation means operatively connected to said electrode means to excite said metal halide laser medium by electrical discharge to produce a laser radiation output from appropriate laser optics associated with said laser housing, the improvement for improving laser operation by minimizing the inductance of the laser assembly, said improvement comprising:

first and second capacitor means positioned within said laser tube housing, said first and second capacitor means consisting of alternate layers of metal and a dielectric insulator, said first capacitor means being secured to the surface of said first electrode means opposite said discharge region and extending approximately the entire length of said first electrode means, said second capacitor means being secured to the surface of said second electrode means opposite said discharge means and extending approximately the entire length of said second electrode means, said metal and dielectric insulator being materials capable of withstanding the chemically corrosive environment of said metal halide laser medium at temperatures of up to approximately 600° C., said metal being selected from a group consisting of gold, platinum, carbon and stainless steel, and said dielectric being selected from a group consisting of quartz, mica and polyimide film.

5. In an apparatus as claimed in claim 4 wherein said excitation means is connected between said first and second electrode means and said first and second capacitor means to form a Blumlein circuit.

* * * * *